United States Patent
Wilson et al.

(10) Patent No.: US 9,189,048 B2
(45) Date of Patent: Nov. 17, 2015

(54) CIRCUIT HAVING A LOW POWER MODE

(75) Inventors: Thomas James Wilson, Pleasanton, CA (US); Christoph Horst Krah, Los Altos, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1234 days.

(21) Appl. No.: 12/208,311

(22) Filed: Sep. 10, 2008

(65) Prior Publication Data
US 2010/0064160 A1    Mar. 11, 2010

(51) Int. Cl.
*G06F 1/32* (2006.01)
*G06F 9/44* (2006.01)

(52) U.S. Cl.
CPC ............ *G06F 1/3203* (2013.01); *G06F 1/3206* (2013.01); *G06F 9/4418* (2013.01)

(58) Field of Classification Search
CPC ....... G06F 1/24; G06F 1/3203; G06F 1/3206; G06F 9/4418; G06F 9/442; Y02B 60/1282; Y02B 60/1285
USPC .................................. 713/300, 320, 323, 324
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,498,987 A * | 3/1996 | Nelson | ............................ 327/143 |
| 5,766,463 A | 6/1998 | Janik et al. | |
| 5,816,225 A | 10/1998 | Koch et al. | |
| 5,825,352 A | 10/1998 | Bisset et al. | |
| 5,835,079 A | 11/1998 | Shieh | |
| 5,842,028 A | 11/1998 | Vajapey | |
| 5,848,281 A * | 12/1998 | Smalley et al. | ............... 713/322 |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |

(Continued)

FOREIGN PATENT DOCUMENTS

| CN | 1164058 A | 11/1997 |
|---|---|---|
| EP | 0 368 144 A2 | 5/1990 |

(Continued)

OTHER PUBLICATIONS

International Search Report mailed Dec. 14, 2009, for PCT Application No. PCT/US2009/056408, filed Sep. 9, 2009, three pages.

(Continued)

*Primary Examiner* — Dennis M Butler
(74) *Attorney, Agent, or Firm* — Morrison & Foerster LLP

(57) ABSTRACT

Embodiments of the invention include an IC that includes a core used for ordinary operation and a thin power circuit. The thin power circuit can be configured to use very little power. The IC can also include a digital interface and a connection thereto. The IC can initiate transition to low power mode during which the core and various I/O pads can be shut down. However, the thin power circuit can be kept powered up. The thin power circuit can monitor the digital interface for a predefined wake up signal. When the wake up signal is detected, the thin power circuit can power up the core and any powered down I/O pads. The thin power circuit can also include a dedicated power on reset (POR) cell. This POR cell can be distinct than other POR cells used for the IC and can be specifically designed to for efficient operation.

43 Claims, 8 Drawing Sheets

(56) References Cited

U.S. PATENT DOCUMENTS

| | | | |
|---|---|---|---|
| 6,327,011 B2 | 12/2001 | Kim | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,345,944 B1 | 3/2008 | Jenkins | |
| 7,663,607 B2 | 2/2010 | Hotelling et al. | |
| 7,831,847 B2 * | 11/2010 | Chen et al. | 713/300 |
| 7,941,682 B2 * | 5/2011 | Adams | 713/322 |
| 8,479,122 B2 | 7/2013 | Hotelling et al. | |
| 2003/0014677 A1 * | 1/2003 | Howard et al. | 713/323 |
| 2003/0025689 A1 * | 2/2003 | Kim | 345/211 |
| 2004/0158750 A1 * | 8/2004 | Syed et al. | 713/320 |
| 2005/0138454 A1 * | 6/2005 | Darmawaskita et al. | 713/323 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2006/0253718 A1 * | 11/2006 | Kawase et al. | 713/300 |
| 2007/0107068 A1 * | 5/2007 | Kelley et al. | 726/34 |
| 2007/0143640 A1 * | 6/2007 | Simeral et al. | 713/320 |
| 2007/0236840 A1 * | 10/2007 | McClure et al. | 361/18 |
| 2008/0086650 A1 | 4/2008 | Ozawa | |
| 2008/0158172 A1 | 7/2008 | Hotelling et al. | |
| 2008/0162969 A1 * | 7/2008 | Royannez et al. | 713/323 |
| 2008/0235527 A1 * | 9/2008 | Heller et al. | 713/320 |

FOREIGN PATENT DOCUMENTS

| | | |
|---|---|---|
| EP | 0 368 144 A3 | 5/1990 |
| EP | 0 368 144 B1 | 5/1990 |
| EP | 1 411 616 A2 | 4/2004 |
| EP | 1 411 616 A3 | 4/2004 |
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report dated Mar. 19, 2014, for CN Application No. 200980135044.2, filed Sep. 9, 2009, two pages.

\* cited by examiner

CIRCUIT HAVING A LOW POWER MODE

FIELD OF THE INVENTION

This relates generally to integrated circuits and more specifically to integrated circuits featuring a low power mode.

BACKGROUND OF THE INVENTION

Power consumption is a very important issue for modern integrated circuits (ICs). Low power consumption is often a desired attribute of all types of electronic devices. However, power conservation can be especially important for portable devices that rely on battery power.

To improve power conservation, many integrated circuits can feature a low power mode (also referred to as a sleep mode). The low power mode can be such that an IC in this mode will consume minimal power while also having reduced functionality. The low power node can be utilized when the IC is not needed. For example, the microprocessor of a notebook computer may go into low power mode when a user closes the notebook without turning it off.

Most digital ICs can include one or more digital interfaces used for communications with the outside world. Operating the digital interfaces usually requires a significant amount of logic and power from the IC. For example, the digital interfaces can be synchronous, and operating them can require generating a clock signal. Therefore, many existing ICs can power down their digital interfaces during sleep mode. However, that means that these ICs cannot receive a signal to power up from the outside world through the digital interface. Thus, many existing ICs include dedicated analog interfaces for the purpose of receiving power-up and power-down signals. Analog signals can be easier to process, and processing them need not require much power.

However, the additional analog interfaces can add significant cost to an IC and the device it is connected to. For example, the analog interface can require additional pins for the IC, additional wires on a printed circuit board (PCB) on which the IC is positioned, additional pins on a second IC that controls the first IC's functionality, etc. These requirements may add up to a noticeable cost increase.

Another existing approach is not to place any low power circuitry into the IC, but to simply remove power coming into the IC. However, this approach can require another external circuit to disconnect power from the IC. Again, this can significantly increase the cost of a device because of additional components required and additional space requirements on the PCB.

SUMMARY OF THE INVENTION

Embodiments of the invention include an IC that includes a core used for ordinary operation and a thin power circuit. The thin power circuit can be configured to use very little power. The IC can also include a digital interface and a connection to the digital interface. The IC can initiate transition to low power mode either in response to an external command or as a result of internal operation. During transition to low power mode the core can be partially or entirely shut down. Furthermore, in some embodiments, any I/O pads used by the device can be shut down, or placed in a low power mode. However, the thin power circuit can be kept powered up. Similarly, I/O pads used to connect to the digital interface can be kept powered up.

The thin power circuit can monitor the digital interface for a predefined wake up signal. When the wake up signal is detected, the thin power circuit can power up the core and any powered down I/O pads.

In some embodiments, the thin power circuit can include a dedicated power on reset (POR) cell. The POR cell of the thin power circuit can be distinct than other POR cells used for the IC (such as any POR cells used for the core) and can be specifically designed to for efficient (i.e., low power) operation.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to an IC featuring a low power mode and the ability to receive and process instructions to exit the low power mode through a digital interface while in the low power mode. Furthermore, the IC of the present invention may include circuits which ensure that the low power mode is truly low power or, in other words, that the ability to receive and process a digital signal does not unreasonably increase the power consumption of the device during the low power mode.

Although embodiments of the invention may be described and illustrated herein in terms of a controller for a multi-touch enabled device, or a controller connected to a Serial Peripheral Interface (SPI), they are not so limited and can encompass any digital IC connected to a digital interface, regardless of the purpose of the IC, or the type of interface.

Figure 1:
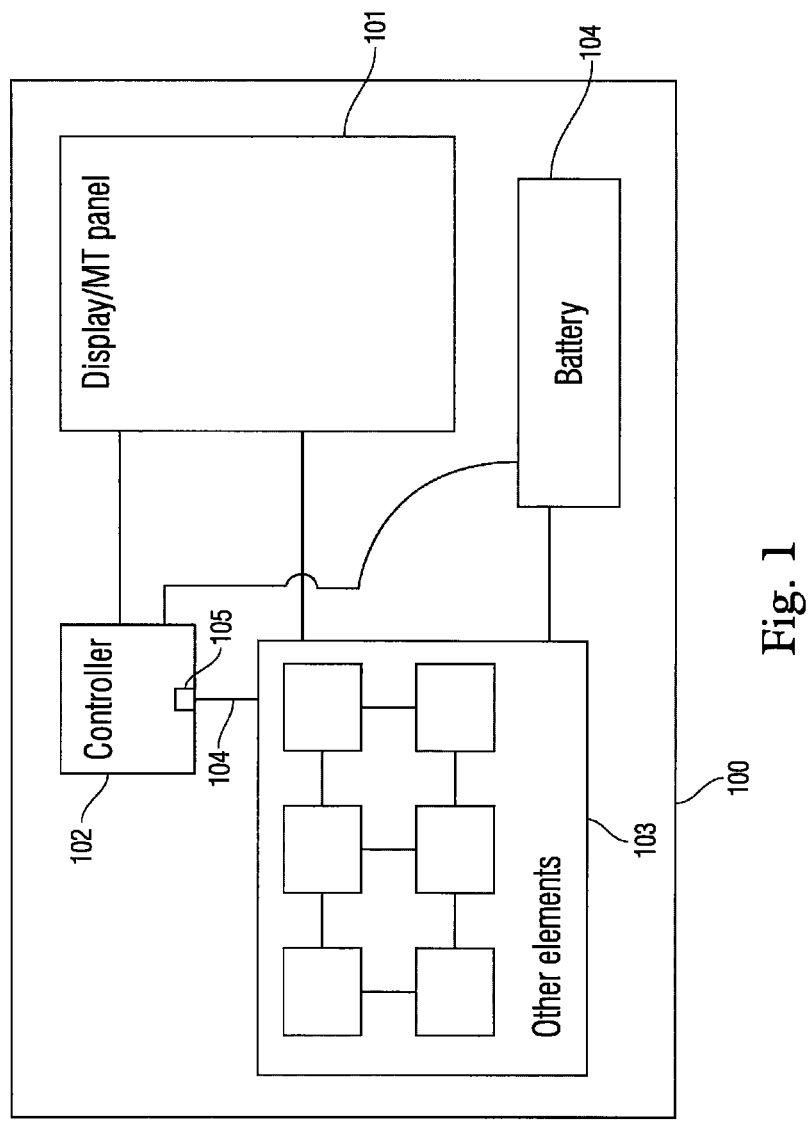
FIG. 1 is a diagram of an exemplary mobile device according to one embodiment of the present invention.

FIG. 1 is a diagram of an exemplary mobile device according to one embodiment of the present invention. More specifically, FIG. 1 is a diagram of a device that can include one or more ICs including the power saving features of embodiments of the present invention.

Device 100 of FIG. 1 can be a mobile phone, a portable audio player or any other type of portable device. It can include a display 101. The display 101 can be a combination of a display and multi-touch panel. A multi-touch panel is a panel that senses touch events thereon, and is able to sense multiple touch events at a time. Thus, the display can be used as a user input device as well. In some embodiments, the display can also include a proximity sensing panel. The display can be connected to a controller 102. The controller can be a multi-touch controller configured to process raw signals incoming from the multi touch panel portion of the display 101. The raw signals can indicate the presence or absence of touch events.

The controller can be connected to other elements 103, which may include a microprocessor, memory, telecommunication circuits, antenna, etc. Other elements 103 can be generically referred to as the host. Battery 104 can be used to power elements 101-103. The controller can be connected to one or more of the other elements through a connector 104, which connects to a digital interface 105. The digital interface can be, for example, a Serial Peripheral Interface (SPI).

A device similar to device 100 is discussed in U.S. patent application Ser. No. 11/649,998, entitled PROXIMITY AND MULTI-TOUCH SENSOR DETECTION AND DEMODULATION filed on Jan. 3, 2007 and incorporated herein by reference in its entirety for all purposes. A person of skill in the art would recognize that the present invention can be used in conjunction with devices discussed in the above application, and other handheld or battery-powered devices.

In practice, the device 100 can spend a significant amount of time in a powered-on state without performing any user interaction (for example, the device can spend hours in a user's pocket). The multi-touch panel need not be used during this time. Since the controller is used to process signals from the multi-touch panel, it can be beneficial to place the controller in a low power mode, when the multi-touch panel is not being used. One or more of the other elements 103 can send commands to place the controller into low power mode and to take it out of low power mode. Embodiments of the invention also provide that the commands for going into and coming out of low power mode can be sent over connector 104 and digital interface 105, which are primarily utilized for usual communications between the controller and the other elements. Thus, additional connectors need not be used for controller 102.

While embodiments of the invention are discussed with reference to device 100 or a similar device, it should be noted that the present invention need not be limited to such a device and may apply to any other device that includes an IC with a digital interface, such as, for example, notebook computers, desktop computers, appliances, etc.

Figure 2:
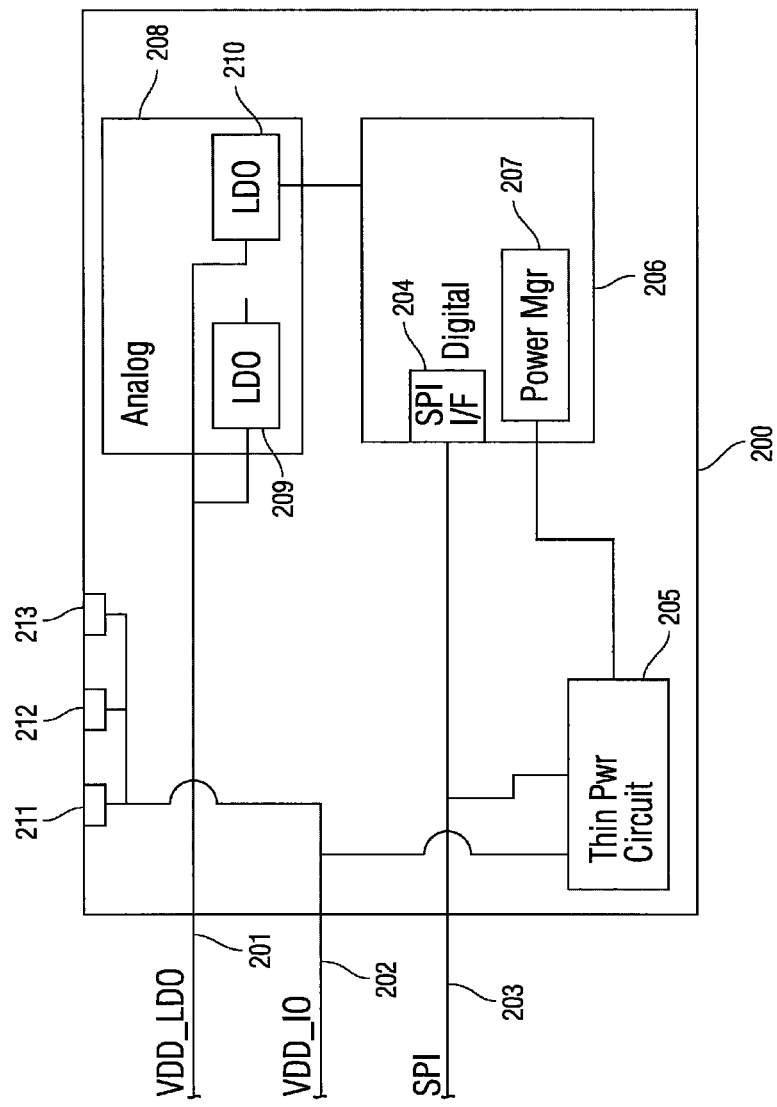
FIG. 2 is a diagram of an exemplary integrated circuit according to one embodiment of the invention.

FIG. 2 is a diagram of an exemplary integrated circuit 200 according to some embodiments of the invention. Integrated circuit 200 can be controller 102 or another type of integrated circuit.

Integrated circuit 200 includes at least two power inputs—VDD_LDO input 201 (the power input for low drop out regulators) and VDD_IO input 202 (the power input for input/output pins and associated circuits). Power received from the VDD_IO input can be used for powering various input/output pads of the IC, such as output pads 211-213. The VDD_LDO input can be used to power the main internal circuitry of the IC through LDOs 209 and 210. Embodiments of the present invention may be able to go into low power mode without requiring any changes to the voltage of the incoming power lines. Thus, according to some embodiments, the IC 200 can go into low or high power mode while its power inputs continue to receive high voltage levels. These power lines can go to low voltage in some occasions. For example, the power lines can go to low voltage when the entire device 100 is removed or the device 100 is turned off (this is referred to as a complete shutdown).

The IC's main internal circuitry can include two major portions—analog core 208 and digital core 206. These cores can perform the primary function of the IC, such as processing analog signals received from a touch panel. These cores can be collectively referred to as the primary operation circuitry, or as "the core". In other embodiments, the IC can perform different functions and include different logic. For example, the IC can include only a digital core.

The VDD_LDO power line can connect to two low dropout regulators (LDOs 209 and 210). The LDOs are usually analog circuits, so they are shown as parts of the analog circuitry 208 (however, it is not required that the LDOs be analog). The LDOs can stabilize and reduce the voltage of the power received from VDD_LDO line. The output of one LDO (such as LDO 209) can be used to power the analog circuitry 208 (with exception of the LDOs, which are powered by the VDD_LDO line). The output of the other LDO (e.g., LDO 210) can power the digital section 206.

The digital section can include a SPI interface 204 for sending and receiving communications to and from a SPI connection 203. The digital section can also include a power manager 207. The power manager can be logic that performs a controlled power down and power up procedure. As used herein, "power down" can refer to going to low power mode, and "power up" can refer to going from low power mode to normal power mode. The power manager can also be used when performing a power up from a completely turned off state.

In some embodiments, the low power mode can use very small amounts of power in comparison to the normal mode. For example, in some embodiments the low power mode can use 5-11 uW while the normal power mode can use 20-30 mW. In other embodiments, the low power mode can use 10 uW while the normal mode can use 35 mW. Thus, in some embodiments, going to low power mode can provide power savings similar to shutting the entire circuit off. To achieve this, most of the circuitry of IC 200 can receive no power at all (i.e., be turned off). Thus, in some embodiments, LDOs 209 and 210 turn off all power to both the digital and analog cores of the IC. Furthermore, all or most of the power going to output pads 211-213 can also be turned off. In some embodiments, power can be turned off not at the LDOs but at another element within IC 200 (not shown) that turns off power to the LDOs.

In some embodiments, not all power for output pads 211-213 is turned off. In these embodiments, various external elements (such as other ICs) may receive a signal from the IC 200 even when the IC 200 is in low power mode. In such cases, turning off the power to the output pads may cause undefined signals to be read by other elements, which is generally undesirable. Thus, in some embodiments, during the low power mode, the power to the output pads can be reduced but not entirely eliminated. The reduced power can be used to keep the state of the output pins steady, without changing it. Other elements that connect to IC 200 can be configured to draw only a predefined limited amount of current from IC 200 while IC 200 is in a low power state, thus allowing IC 200's output pads to operate on a relatively small amount of reduced power.

Since the power manager 207 is part of the digital core of the IC 206, power to it can be turned off as well during the low power mode. This can be desirable because the function of the power manager can be complex and it can include a relatively large amount of circuitry which can cause it to use a large amount of power. Consequently, keeping the entire power manager running during low power mode can use too much power and thus go against the overall purpose of low power mode.

However, if the power manager is turned off during low power mode, it may not be able to "wake up" the IC (i.e., cause it to go into normal power mode). Embodiments of the present invention provide that the wake up signal is to be sent by way of digital signals over an already existing digital connection. Thus, according to some embodiments, the wake-up signals are not only digital, but may need to comply with an existing digital interface standard (such as, for example, the SPI standard) used during ordinary communications between the IC and a host or other elements. Such a standard can provide for relatively low powered signals in order to save power during ordinary communications. However, these low power signals can be entirely unsuitable to be processed by un-powered circuits and are usually processed by relatively complex powered circuits, such as SPI interface 204. The SPI interface 204 can also be part of the digital core 206 and thus can be turned off during the low power mode. Being powered off, the SPI I/F cannot process a wake up signal coming in through the SPI connector 203.

Embodiments of the present invention address the above issues by providing for a thin power circuit 205. The thin power circuit (TPC) can be a circuit that does not lose power during the low power mode. It can be continuously powered by the VDD_IO power line (i.e., even during low power mode). (Alternatively, the TPC can be powered by another power line, such as the VDD_LDO line). The TPC can be connected to the SPI connection 203 and can listen for a predefined wake up signal during the low power mode. If the TPC receives the wake up signal it can send signals that power up the power manager 207 which can, in turn, proceed to power up the rest of the IC. Alternatively, the TPC can power up the entire IC.

While in normal power mode, the TPC can ignore the SPI connection 203. In this mode, the SPI connection 203 can be used for ordinary operational communications between the IC 200 and external elements (such as the host). These communications can be handled by the SPI I/F 204 without the involvement of the TPC.

In some embodiments, the TPC can also participate in the power down process (i.e., in switching to low power mode). This can allow the TPC to prepare or "arm" itself for the low power mode.

Since the TPC operates during the low power mode, it can be optimized to minimize its power dissipation. This can include reducing its electronic elements to a bare minimum necessary to perform its function. For this reason, the TPC can be referred to as a "thin" circuit.

Figure 3:
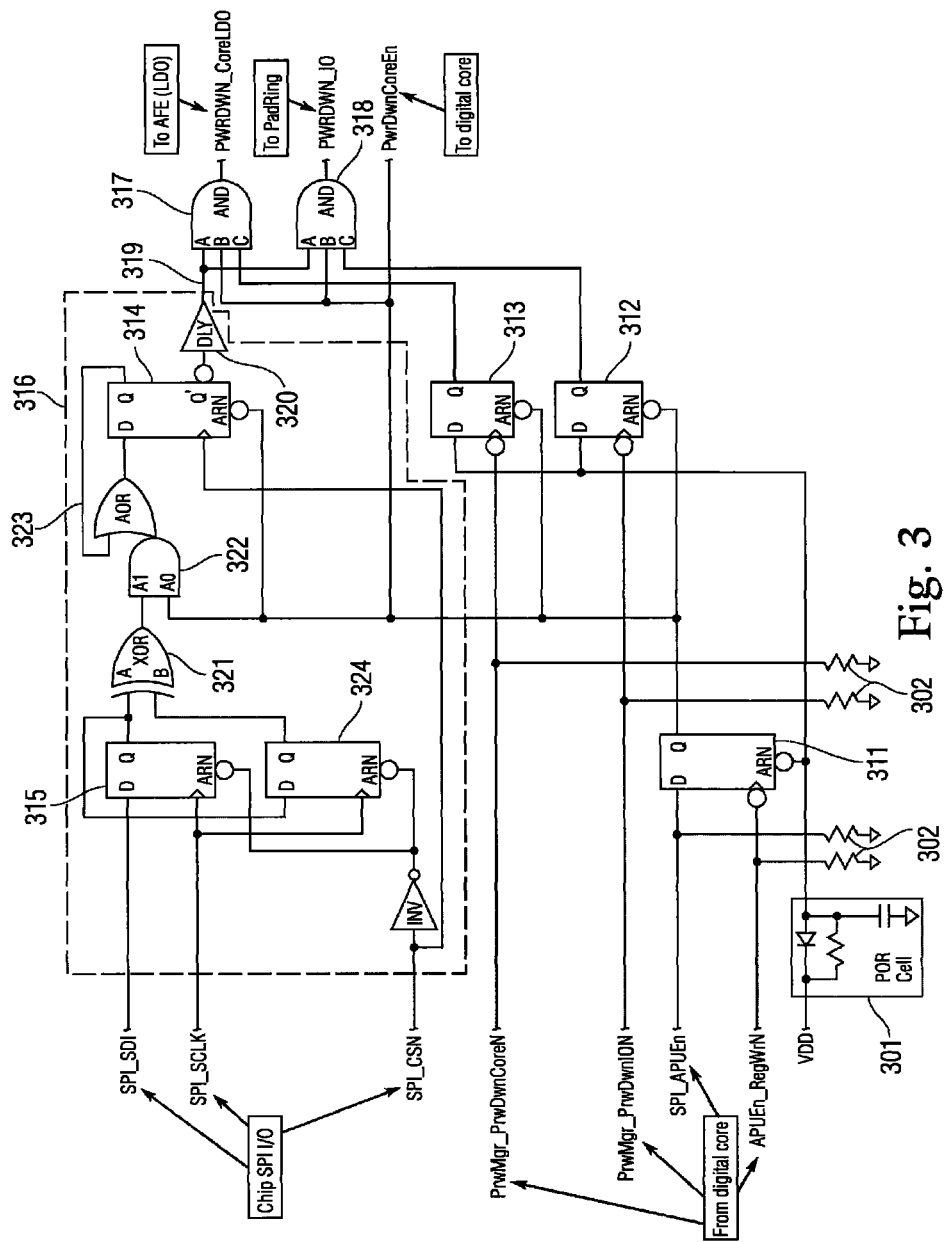
FIG. 3 is a diagram of the thin power circuit according to one embodiment of the invention.

FIG. 3 is a diagram of an exemplary TPC according to some embodiments of the invention. All elements of the TPC (e.g., all flip flops and gates) can be powered by the VDD_IO power line. Thus, the TPC can be referred to as being in the VDD_IO power domain. As noted above, the TPC can be connected to the VDD_IO power line without the use of any circuits that power down the TPC during the low power mode.

The VDD_IO power line can also be connected to a power-on reset (POR) cell 301. The POR cell can be used to ensure that the TPC is correctly initialized during power-on. While the TPC can be powered during low power mode, it does lose power when all power to the entire IC is turned off (i.e., at complete shutdown). In that event, the VDD_IO power line would lose power, which in turn would cause the TPC to lose power. Therefore, the TPC must be able to correctly emerge from complete shutdown and prevent undefined values from being stored in its flip-flops. This can be accomplished by the use of POR cell 301.

The POR cell outputs either a '0' or a '1' depending on the voltage at the VDD_IO line. After the voltage at the VDD_IO line goes over a predefined threshold (and after a predefined delay), the POR cell can switch from '0' to '1'. Thus, during a power up from a complete shutdown, the output of the POR cell will be initially '0' and will then switch to '1', remaining at '1' until the next complete shutdown. During a delay caused by the POR cell, during which time there is power at the VDD_IO line and yet the output of the POR cell is still at '0', flip flop 311 can be reset to '0'. After being reset, flip flop 311 can send out a '0' signal from its Q output which can reset flip flops 312-314 (note that in this particular circuit the flip flops can reset asynchronously on a low signal).

The TPC may differ from existing circuits in its use of a POR cell, and the type of POR cell it uses. First, the TPC only needs to use the POR cell during power up from a complete shut down as it retains power during the low power mode. Most other circuits (i.e., analog and digital cores 208 and 206 of FIG. 2) can lose power during the low power mode and may need to be reset by a POR cell every time the IC comes out of the low power mode. Thus, a different POR cell may need to be used for the TPC and for other circuits (such as cores 208 and 206 of FIG. 2). Furthermore, POR cell 301 is powered up as long as the IC 200 receives power, including during the low power mode. Thus, POR cell 301 uses power during the low power mode. POR cell 301 need not output a very strong signal as it is only used by a small number of flip flops. For the above reasons, embodiments of the invention can feature a custom designed POR cell that features relatively little power dissipation and a relatively low current output signal. Thus, the POR cell of the thin power circuit may be configured to use much less power than other POR cells that may be used throughout the IC (such as POR cells used for the digital core and the analog core).

The TPC can receive various signals from the digital core 206 (and, more specifically, the power manager 207) of FIG. 2. These can include the PwrMgr_PwrDwnCoreN (power manager power down core enable), PwrMgr_PwrDwnION (power manager power down input output enable), SPI_APUEn (serial peripheral interface auxiliary power unit enable), and APUEn_RegWrN (auxiliary power unit enable register write enable) signals, explained in further detail below. The "auxiliary power unit" can be a more general designation for the thin power circuit. It can be expected that these signals will be at '0' during the low power mode when the digital core and the power manager are powered down. Referring again to FIG. 3, resistive pull-downs 302 can be used to ensure that these lines drop to '0' during the low power mode, after the power manager and the digital core stop driving them.

Inputs SPI_SDI, SPI_SCLK and SPI_CSN can represent SPI connection 203. These inputs are defined by the SPI standard. The SPI_SDI input can be the data input, the SPI_SCLK input can be the bus clock input, and the SPI_CSN can be the chip select or slave select input.

In some embodiments the switch to low power mode can be initiated by a command issued from the host, or another device external to the IC 200 of FIG. 2. The command can be received through SPI connection 203 and SPI interface 204. In some embodiments, the command can be a command to write to a predefined register. The predefined register can be flip flop 311 of FIG. 3.

The command to write to flip flop 311 can be received and processed by the digital core. As a result of the command, the digital core (or more specifically, the power manager) can set the SPI_APUEn signal to '1' and send a low-high-low (or, '0, 1, 0') pulse on the APUEn_RegWrN signal. This can result in the value '1' being stored in the flip flop 311. A single pulse can be used for the clock input of flip flop 311 instead of a continuous clock in order to save power. In other embodiments, the digital core can initiate a switch to low power mode by itself and send the above discussed signals without a command from the host.

Figure 4:
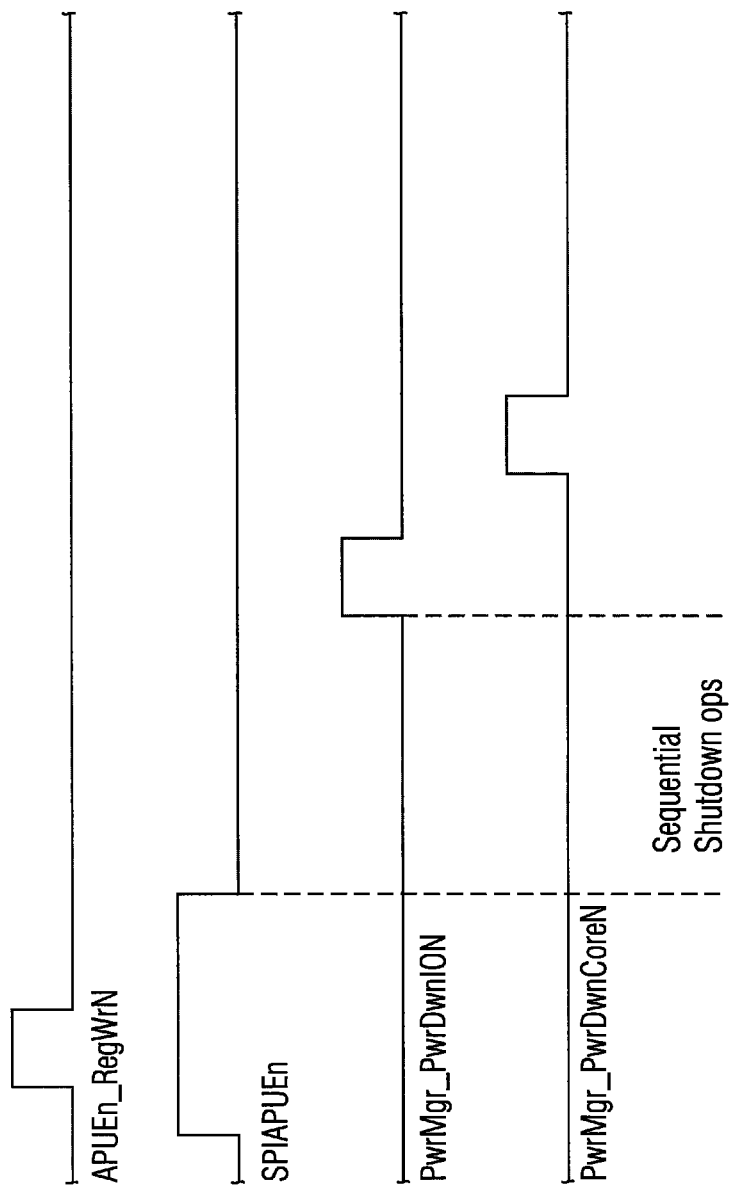
FIG. 4 is a diagram of an exemplary set of signals received by the thin power circuit according to one embodiment of the invention.

FIG. 4 is a diagram of exemplary SPI_APUEn and APUEn_RegWrN signals as they convey the command to go to low power mode to the TPC. As can be seen, the APUEn_RegWrN signal can be a single pulse and the SPI_APUEn can be a wider pulse that encompasses the APUEn_RegWrN pulse, thus ensuring that a '1' gets written into the flip flop 311. Both of these signals can be active high, and can be high relatively rarely (i.e., only when a command to go to low power mode has been issued). Consequently, both signals can be low most of the time, thus ensuring that not much power is wasted at resistive pull-downs 302.

Before the write operation to flip flop 311 discussed above, flip flop 311 stores a value of '0'. Thus, the Q output of flip flop 311 is '0'. This output keeps flip flops 312-314 in reset state (i.e., in a state which ensures their values are '0' regardless of what inputs are applied to them). Once a '1' is written into flip flop 311, its Q output goes to '1'. Consequently, flip flops 312-314 are taken out of reset and new values can be written to them. This can be referred to as arming flip flips 312-314.

The Q output of flip flop 311 also goes to the digital core as a PwrDwnCoreEn. This signal goes to the power manager and indicates to the power manager that it should start a shutdown operation. Once a '1' is passed from the Q output of flip flop 311 to the power manager through the PwrDwnCoreEn signal, the power manager starts performing sequential shut down operations necessary for entering into low power mode, such as shutting down clocks, etc.

Once the power manager finishes performing the sequential shut down operations, it can send two more pulses. More specifically, the power manager can send a low-high-low pulse to the PwrMgr_PwrDwnION signal, and can subsequently send a similar pulse to the PwrMgr_PwrDwnCoreN signal. Examples of these two pulses are shown in FIG. 4. These two signals are connected to the clock inputs of flip flops 312 and 313 of FIG. 3. Once the pulses of these signals reach the flip flops, the flip flops read and store the signal that is at their input D. The signal at the inputs is the output of the POR cell which is '1'. Thus, flip flops 312 and 313 can consecutively store and output a '1'. This can result in a '1' being sent to the C inputs of AND gates 317 and 318. The B inputs of these gates can already be at '1' due to the Q value of flip flop 311 going to '1' as a result of the SPI_APUEn and APUEn_RegWrN signals (see above).

Circuit portion 316 (or circuit 316) can be used to detect the receipt of a wake up signal from the SPI connection. As noted above, the wake up signal can be a signal that causes the IC to go from low power mode to a normal power mode. Since a wake up signal may only be expected/relevant while the IC is in low power mode, circuit 316 need not be used during normal power mode. Therefore, circuit 316 can be configured to be in a disarmed state during normal power mode. In its disarmed state, circuit 316 may output a predefined signal (in the present example, a '1'), regardless of what inputs may appear at the SPI connection. Circuit 316 may be placed in an armed state during low power mode. In its armed state, the circuit may monitor the SPI connection for a wake up signal and output signal 319 which depends on whether a wake up signal has been received over the SPI connection. In the present example, the output of circuit 319 when armed can be a '1' when no wake up signal has been received and '0' when a wake up signal has been received. In some embodiments, circuit 316 may also be placed in the armed state during the transition to low power mode.

Flip flop 311 can arm and disarm circuit 316. The Q output of flip flop 311, can connect to the reset input of flip flop 314 as well as the A0 input of ANDOR gate 322. Flip flop 311 can be at '0' during normal power mode. When flip flop 311 goes to '0' it resets flip flop 314 placing it at value '0'. This can cause signal 319 (connected to the inverse Q' output of flip flop 314) to go to '1'. During normal power mode, the '0' output of flip flop 311, by virtue of its connection to the reset input of flip flop 314, ensures that flip flop 314 remains at '0' thus ensuring that the output of circuit 316 remains at '1'. Also during normal power mode, the '0' output of flip flop 311, by virtue of its connection to ANDOR gate 322, ensures that the output produced from XOR gate 321 is irrelevant. As discussed in more detail below, the output of gate 321 is a value that indicates whether a wake up signal has been received over the SPI connection. The above two connections between flip flop 311 and circuit 316 can ensure that circuit 316 produces a '1' during the normal power mode regardless of what signals may appear at the SPI connection. In other words, these two connections ensure that the circuit 316 is disarmed when flip flop 311 is at '0' (i.e., during normal power mode). While it may be argued that the connection between the flip flop 311 and gate 322 is theoretically redundant, it can be good design practice to use it in order to avoid unusual events that may lead to race conditions, undefined states, etc.

As discussed above, flip flop 311 can go to '1' during the transition between normal power mode and low power mode. More specifically, after the power manager sends the pulses on the SPI_APUEn and APUEn_RegWrN lines, flip flop 311 can go to '1'. Once flip flop 311 goes to '1', it takes flip flop 314 out of reset, and sends a '1' to the A0 input of ANDOR gate 322 which in turn makes the output of XOR gate 321 relevant. Thus, once flip flop 311 goes to '1', circuit 316 can be armed. At this point, the output 319 of circuit 316 is no longer held at '1' and can depend on whether there is a wake up signal received over the SPI connection. More specifically, signal 319 can remain at '1' if no wake up signal is received or go to '0' if a wake up signal is received.

However, signal 319 can be expected to stay at '1' during the transition to low power mode. At the point of arming circuit 316, flip flop 314 can be at '0'. It can switch to 1 only if a value '1' is loaded into it through its D input. As discussed in more detail below, a '1' can be loaded into flip flop 314 when circuit 316 detects a wake up signal on the SPI connection. However, a wake up signal is not expected to appear during the transition to low power mode. Usually, this can only happen if the IC receives a power down signal and a wake up signal in a very quick succession. This event is considered highly unlikely and in some embodiments design requirements may be put in place to ensure that this event never takes place. Other embodiments may provide for a slight modification of the circuit of FIG. 3 to account for this possibility. More specifically, some embodiments may provide that the A0 input of gate 322 is connected to the Q output of flip flop 313 instead of that of flip flop 311. This would delay the arming of circuit 316 so that that circuit is essentially disarmed throughout the transition to low power state. This may prevent any issues that may occur as a result of a very quick succession of power down and power up signals.

Thus, for various embodiments, it can be assumed that the output 319 of circuit 316 remains at '1' during the transition to low power mode.

Therefore, when the pulses on the PwrMgr_PwrDwnION and PwrMgr_PwrDwnCoreN lines along with flip flops 312 and 313 cause the C inputs of gates 317 and 318 to go to '1', the A inputs of these gates can also be at '1'. As noted above, the B inputs are also at '1' due to the Q output of the 311 flip flop. Thus, the PwrMgr_PwrDwnION and PwrMgr_PwrDwnCoreN pulses can cause a '1' to be consecutively output from the PWRDWN_IO and the PWRDWN_CoreLDO signals, respectively. These signals can cause a complete power down of the IO pads (caused by the PWRDWN_IO signal) and the digital and analog cores (caused by the PWRDWN_CoreLDO signals). After these two signals are activated, the IC can enter low power mode. In some embodiments, as discussed above, not all power to the IO pads is shut down. Instead, the IO pads are placed in low power mode in which they can keep a steady unchanging state without expending too much power.

Once the entire IC goes into low power mode, most of the IC (such as the analog and digital cores) may be unpowered. However, the thin power circuit can remain powered by the VDD_IO line. At this time, portion 316 of the TPS can be armed. In other words, it can monitor the IC's SPI connection for a wake up signal. During low power mode, the flip flop 311 can remain at '1' (it having been set at '1' during the transition to low power mode, as discussed above). Thus, the Q output of flip flop 311 can keep flip flop 314 out of reset and send a '1' to the A0 input of gate 322. This can arm circuit 316—i.e., enable it to perform its power up function. In other words, it can allow circuit 316 to produce a value at line 319 based on its inputs SPI_SDI, SPI_SCLK and SPI_CSN instead of only producing a '1' as it does when disarmed.

Figure 5:
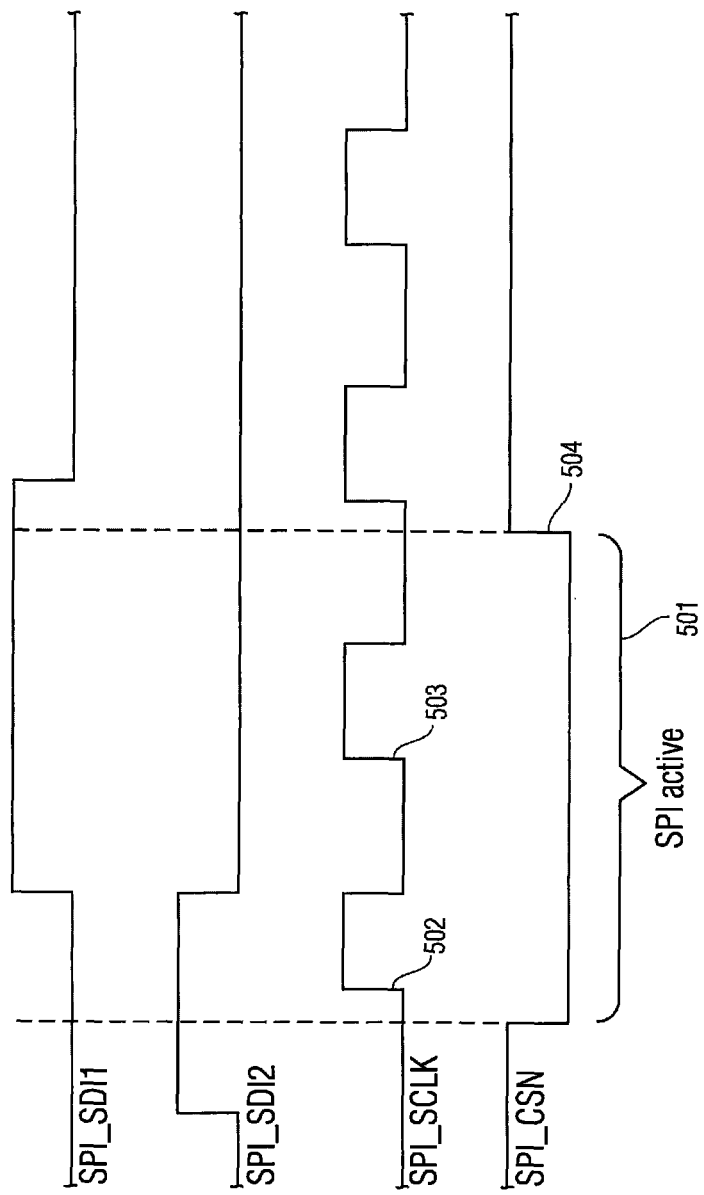
FIG. 5 is a diagram of two exemplary wake up signals according to one embodiment of the invention.

The wake up signal on the SPI connection can be a sequence of different consecutive bits. Thus, the wake up signal can be a <0,1> or a <1,0> sequence. These bits can be sent according to the usual SPI protocol. FIG. 5 is a diagram of two exemplary wake up data signals (SPI_SDI1 and SPI_SDI2) along with the other SPI signals. Either the SPI_SDI1 or the SPI_SDI2 signal in combination with the SPI_SCLK and SPI_CSN signals shown in FIG. 5 can form a valid set of wake up signals. The chip select signal SPI_CSN can be low while the wake up signal is taking place to signify that the SPI connection is active. Usually, an active SPI connection is indicated by a low chip select signal. Thus, the entire wake up signal can take place during the period of low chip select signal 501. The chip select signal can be low during clock cycles. Thus, the active period of the SPI connection 501 can span two rising clock cycles 502 and 503. This can be significant, because flip flops 315 and 324 can be of the type that store input values at rising clock cycles. Other embodiments can use other types of flip flops which may result in modifications in the wake up signals that would be apparent to those skilled in the art. The SPI_SDI wake up signal (e.g., either one of signals SPI_SDI1 and SPI_SDI2 of FIG. 5) can have a first value at the first rising clock edge and a second value at the second one. Thus, signal SPI_SDI1 can be at '0' on the first rising edge and at '1' on the second one and signal SPI_SDI2 can be at '1' on the first rising edge and at '0' on the second one.

FIG. 5 shows exemplary wake-up signals according to one possible configuration of the SPI interface. A person of skill in the art would understand that different configurations of the SPI interface may result in different signals. While FIG. 5 shows a configuration in which signals change on a falling edge of the clock and are read on the rising edge, different embodiments can operate based on other configurations (such as, e.g., configurations that feature signals that change on a rising edge and are read on the falling edge). Appropriate flip flops 315 and 324 may need to be selected in accordance with the SPI configuration to be used, so that the flips flops read incoming signals at the appropriate time (e.g., rising or falling clock edge).

The wake up signals of FIG. 5 can be beneficial, because they are relatively simple (thus allowing them to be received and processed by relatively thin logic) yet at the same time they represent a valid data frame that can be sent over a SPI connection (thus allowing an existing digital SPI interface to send wake up signals without any modifications). It should be noted that the wake up signal can be considered to include a set of multiple signals (e.g., signals SPI_SDI, SPI_SCLK and SPI_CSN), not just the data signal SPI_SDI. Thus, if a correct wake up data is sent over the SPI_SDI data line, but the SPI_CSN chip select signal is not enabled, or there is no clock edge on the SPI_SCLK signal, a wake up signal may not be detected. This can avoid unintentional wake ups due to noise or the like.

The host, or any other element external to the IC 200 that may be tasked with waking the IC 200 up can ensure that the IC 200 either receives a stream of data of identical bits or that the chip select signal to IC 200 is kept inactive (i.e., high), until the time the IC 200 is to be brought out of low power mode. When the IC 200 is to be brought out of low power mode, the host can make sure the chip select signal SPI_CSN is active and send a set of alternating bits to the IC 200 to wake it up. Persons of skill in the art would recognize that other types of wake up signals can be used with various different embodiments of the invention. For example, other wake up signals that include more than two bits can be used. Modifications of portion 316 may be necessary to recognize other wake up signals.

In some embodiments, the wake-up command may include error checking for additional robustness or a code key to prevent unauthorized access to the power down function. Thus, for example, the data incoming from the host can include payload data and error checking data. The payload data may be a command to power up. The error checking data may be used to ensure that the payload data is correctly transmitted. Thus, the thin power circuit can check the payload data using the error checking data before processing the payload data and powering up the core (if the payload data does in fact include a power up command). Various known protocols for error checking, such as, for example, cyclic redundancy checking or the Reed Solomon argument, can be used.

Flip flops 315 and 324 can be kept in a reset state when the chip select signal SPI_CSN is kept inactive (or high) and taken out of reset state when signal SPI_CSN goes active (or low). Once out of reset, flip flop 315 can store the current value of SPI_SDI at every SPI_SCLK clock cycle, while flip flop 324 can store the last clock cycle's value. Exclusive OR gate 321 can output a '1' only when the Q outputs of flip flops 315 and 316 are different. This may happen when two different sequential data bits (i.e., a wake up signal) are received over the SPI_SDI line. Therefore, XOR gate 321 can output a '1' when a wake up signal is received. Since, at this point, the IC can be in low power mode, flip flop 311 can store a '1' which can make the A0 input of gate 322 high. This can cause ANDOR gate 322 to propagate the '1' output of gate 321 to flip flop 314. Flip flop 314 can store the '1' value when the signal connected to its clock input provides a rising edge. This signal can be the SPI_CSN signal. Thus, flip flop 314 can store the '1' value when the SPI_CSN signal goes to '1' or the link becomes inactive (e.g., at time 504 of FIG. 4).

Feedback path 323 can be used to ensure that once a '1' is loaded into flip flop 314, the flip flop remains storing a '1' until it is reset (regardless of what other signals may be sent over the SPI connection). Thus, once a '1' is loaded into flip flop 314, the flip flop is locked into that state and will continue to store a '1' until reset. Storing a '1' into flip flop 314, can also cause its inverse output (Q') to go low. This can cause output 319 of circuit 316 to go low. This can indicate that a wake up signal has been received. When signal 319 goes low, it can propagate through gates 317 and 318 and cause signals PWRDWN_IO and the PWRDWN_CoreLDO to go low. By going low, these signals can restore power to the digital and analog cores. At this point, power to the power manager 207 can be restored and it can perform any steps necessary to return the IC 200 to normal operation (such as restarting clocks, etc.)

Once powered up, the power manager (or another portion of the digital core) can send a single pulse on the APUEn_RegWrN signal while keeping the SPI_APUEn signal at '0'. This can cause the flip flop 311 to go to '0', which can be its usual state during the normal power mode. Once at '0', flip flop 311 can by way of its Q output put flip flops 312 and 313 in the reset state. This can also be the usual state of these flip flops during the normal power mode. Furthermore, flip flop 311 can disarm circuit 316 by resetting flip flop 314 and sending a '0' to the A0 input of ANDOR gate 322. Thus, the entire TPC can be placed in normal power mode. At this point, the TPC can be ready to initiate another transition to low power mode if the appropriate pulses are sent on the APUEn_RegWrN and SPI_APUEn connectors.

However, setting flip flop 311 to '0' may cause a race condition to occur. Before flip flop 311 is set to '0', the A, B and C inputs of both of gates 317 and 318 can be '0', '1' and '1', respectively. The '0' input can be supplied by the circuit 316, while the '1' inputs are supplied by flip flops 311, 312 and 313. Therefore, gates 317 and 318 can output '0' (said output having caused the digital core to be powered up, as discussed above). In order to correctly transition into and operate in normal power mode, the output of gates 317 and 318 should remain at '0' until a new power down signal is received. Setting flip flop 311 to '0' can cause the A, B and C inputs of gates 317 and 318 to go to '1', '0' and '0', respectively. This should ensure that the outputs of gates 317 and 318 remain at '0'. However, it may be conceivably possible (albeit extremely unlikely) that the A input of either of gates 317 or 318 goes to '1' before their B and C inputs go '0'. This can cause at least one of these gates can output a '1' for a short period of time. This can result in an erroneous shutdown of the digital and analog cores and/or the I/O pads. To prevent this, a delay circuit 320 may be inserted at the output of circuit 316 as shown.

In the above discussed embodiments, the digital and analog cores (or the core) can be completely shut down during low power mode. Thus, the process of powering up the core from low power mode can be very similar to the process of powering up the core from complete shutdown. However, the core (or certain software or firmware running at the core), may need to be aware whether it is being powered up from complete shutdown or as a result of exiting low power mode. This can be achieved by consulting the PwrDwnCoreEn signal. If the IC 200 is powering up from a complete shutdown, flip flop 311 can be reset by the POR cell 301 and can output a '0' as a result. This '0' can reach the core as the PwrDwnCoreEn signal. This can indicate to the core and any firmware running thereon that the IC 200 is being powered up from a complete shutdown. If the IC 200 is exiting low power mode, the flip flop 311 can be at '1' during the initial stages of the transition to normal power mode. Again, this '1' is propagated as the PwrDwnCoreEn signal and can indicate to the core or any firmware running thereon that the IC 200 is exiting low power mode.

A person of skill in the art can appreciate that the above discussed circuit can be beneficial because it is relatively small, (and thus has small power dissipation) while being also capable of reading a valid digital signal over a digital connection. One notable feature of the TPC as shown in FIG. 3 is a primary state flip flop (this being flip flop 311 in the above example). This flip flop can place the TPC in one of two different states, which are related to the power modes of the entire IC the TPC is part of. In the first state, the entire IC can be normal power mode. In this state, the TPC can essentially ignore signals from the SPI connection while waiting for signals from the core that may indicate transition to low power mode. ("Essentially ignore" may mean that the outputs of the TPC do not depend upon signals coming in from the SPI connection). The second state can indicate that the IC is in low power mode. In this state, the TPC can process incoming signals from the SPI connection to determine whether any wake up signals arrive and can initiate transition to normal power mode if it detects any wake up signals. The primary state flip flop can have different values in these two different states, and the entire TPC circuit can change its behavior in accordance with that flip flop's values in order to operate according to the respective state. In the embodiment discussed above, the primary state flip flop is set at '0' during the first state and at '1' during the second state, but this is not required.

It should be noted that in some embodiments there may also be one or two transitional periods in which the IC is transitioning from normal power mode to low power mode or vice versa. These can be handled in different manners. For example, in the embodiment discussed above, flip flop 311 is at '1' (its second state value) during most of the transition from normal to low power as well as most of the transition from low power to normal power. However, this is not required for all embodiments, and those skilled in the art would recognize that different versions of the TPC can handle the transitional states differently.

Furthermore, other embodiments can feature other circuits that need not use a primary state flip flop.

Another feature of the TPC circuit of some embodiments is that some of its inputs (e.g., inputs PwrMgr_PwrDwnCoreN, PwrMgr_PwrDwnION, SPI_APUEn, and APUEn_RegWrN) can actually be connected to circuits that are unpowered at certain times (e.g., the digital core 206, the power manager 207). Inputs that are connected to unpowered circuits may be considered problematic because their values may become undefined (such inputs are not always guaranteed to be zero when unpowered). Thus, the thin power circuit of some embodiments (such as the one discussed above) can use specific features such as resistive pull downs 302 to ensure that these inputs are defined when unpowered. Furthermore, the IC 200 can be configured to use these lines to only send relatively short bursts of high signals, in order to avoid wasting power at the resistive pulldowns. Other embodiments can use other methods of dealing with inputs connected to unpowered sources. In some embodiments, such signals can be avoided.

Figure 6:
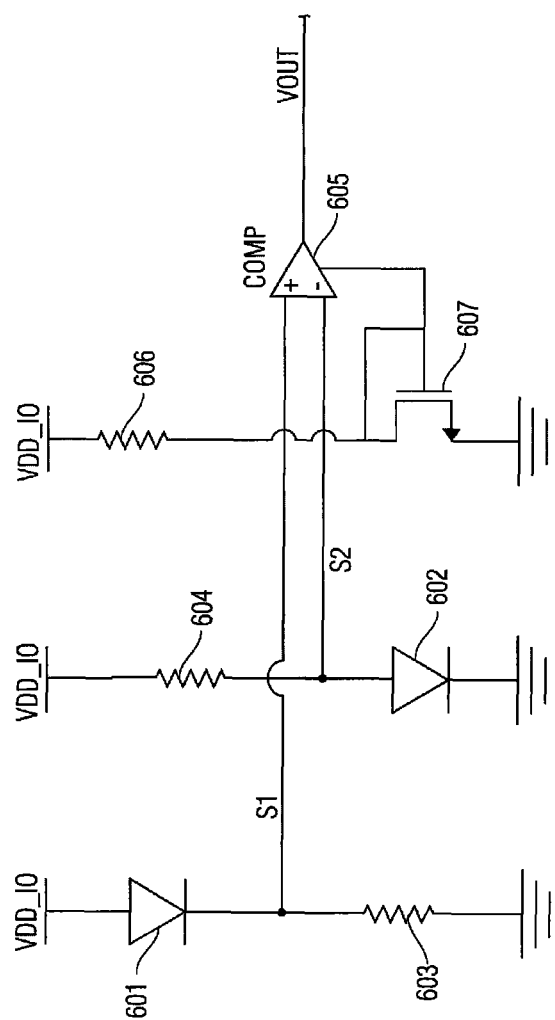
FIG. 6 is a diagram of an exemplary power on reset cell according to one embodiment of the invention.

FIG. 6 is a diagram of an exemplary POR cell according to some embodiments. As shown, the POR cell can include diodes 601 and 602, resistors 603, 604 and 606, a transistor 607 and an op-amp 605. Resistor 606 in combination with FET 607 forms a bias supply for comparator 605. The transistor can be a field effect transistor (FET), such as a metal oxide semiconductor FET (MOS-FET). The op-amp can be placed in a comparator configuration, as shown.

Figure 7:
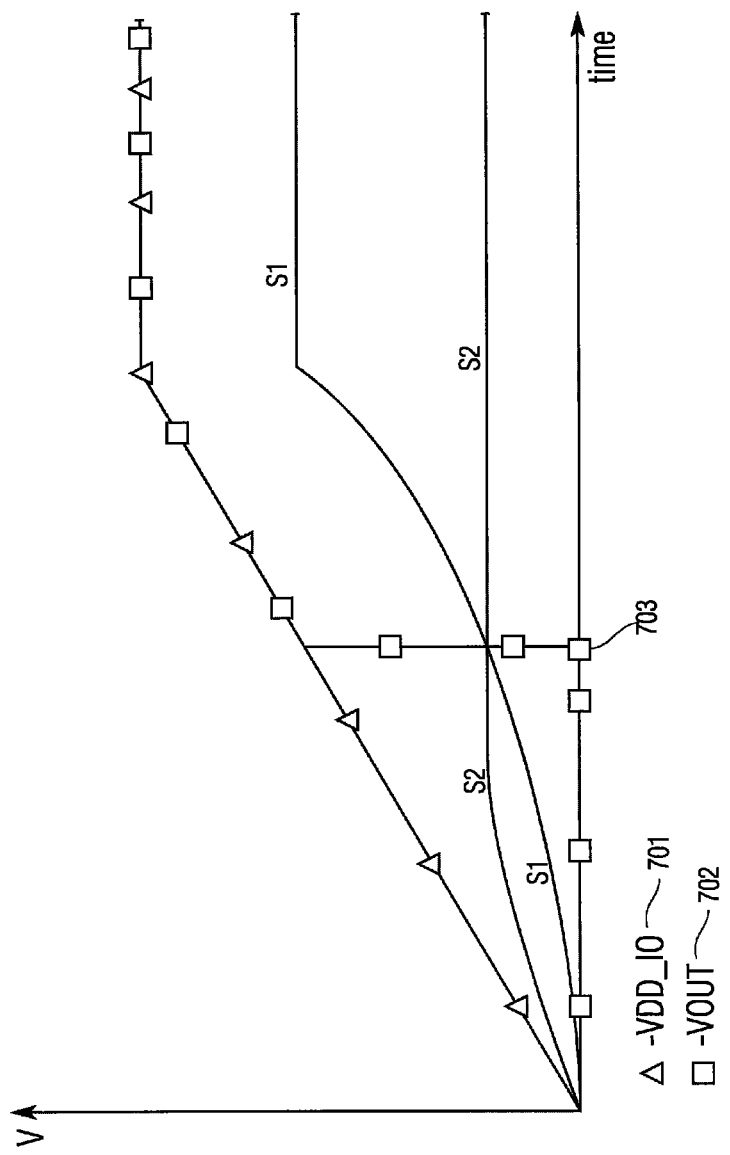
FIG. 7 is an exemplary signal diagram of an exemplary power on reset cell according to one embodiment of the invention.

FIG. 7 is an exemplary signal diagram of the power on reset cell of FIG. 6. FIG. 7 shows the input VDD_IO signal 701 and the output of the POR cell (Vout signal 702). Also shown are two internal signals, S1 and S2, which can be the two inputs of the comparator op-amp (see FIG. 6). As seen, the output signal Vout can be initially at '0' as the input signal VDD_IO rises in voltage. The impedances ZD601 and ZD602 of diodes 601 and 602, respectively, can be high until VDDIO rises above their forward voltage threshold level Vfw. The resistances R603 and R604 of resistors 603 and 604 respectively can be constant (as usually the case for resistors). This means that S1 can be initially lower than S2 since R603/ZD601<<ZD602/R604 and the comparator output remains low, holding the thin power circuit in reset. When VDDIO rises past the forward voltage threshold Vfw of diode 602, the latter clamps the voltage S2 to Vfw. At the same time S1 continues to rise until its voltage is approximately one forward voltage drop Vfw below VDDIO. At the time at which voltages at nodes S1 and S2 intersect (Point 703) the comparator 605 goes high. Point 703 can be defined by the parameters of the various circuit elements (e.g., resistors, diodes). Point 703 can be selected to avoid any undefined states from taking place in flip flops to which Vout may connect.

Figure 8:
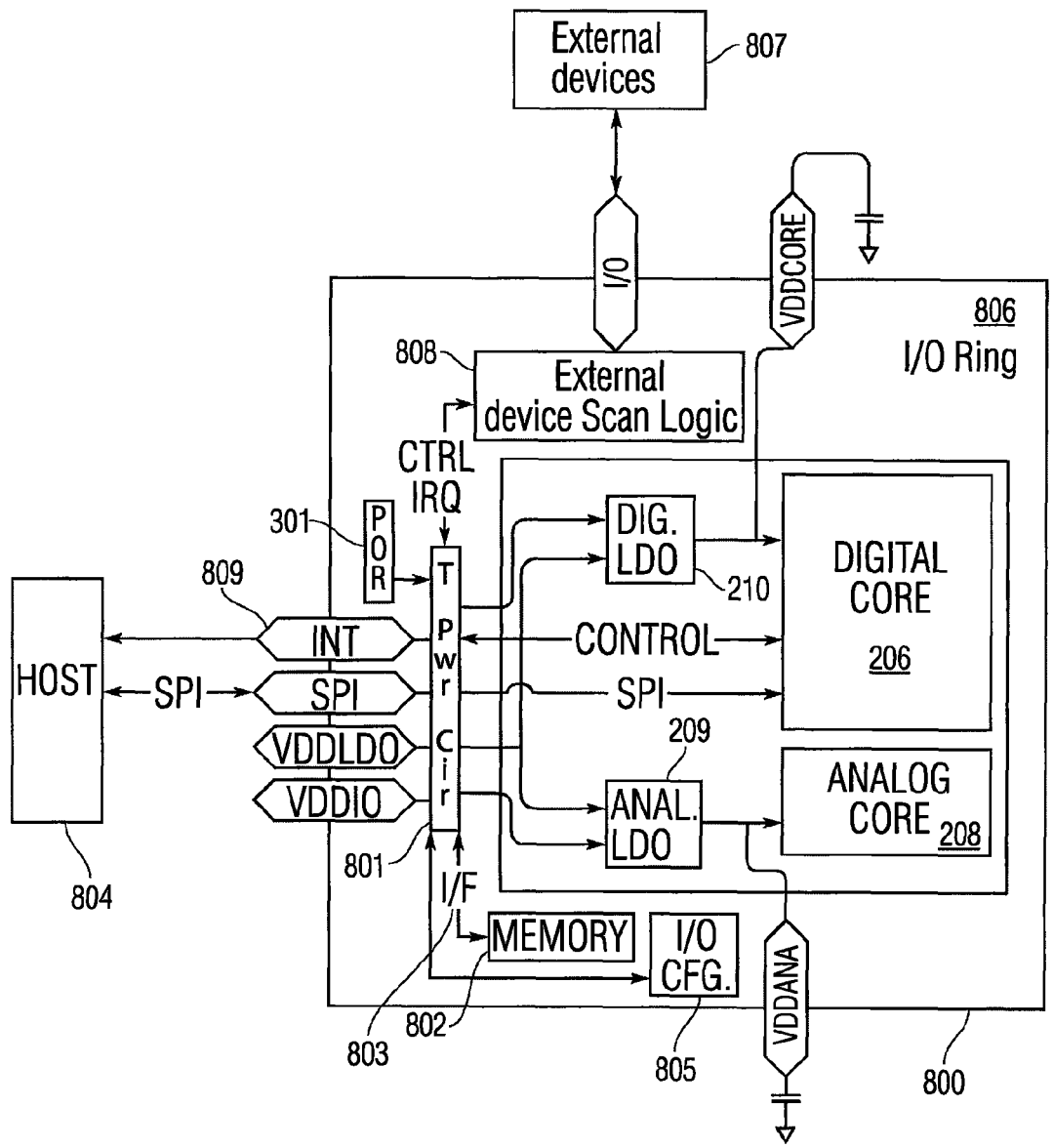
FIG. 8 is a diagram of an exemplary integrated circuit according to another embodiment of the invention.

In some of the above discussed embodiments, the thin power circuit can be configured to perform a single function while the device is in a low power mode—place the device in normal power mode upon the receipt of a predefined signal. However, other embodiments may allow a similar thin circuit to perform additional functions while in low power mode. Some such embodiments are shown by FIG. 8. FIG. 8 is a diagram of an IC 800, similar to that of FIG. 2. However, the IC of FIG. 8 can include a more complex thin power circuit capable of additional functionality.

The thin power circuit can perform additional functions. Thus, it can stay powered on during low power mode, monitor the SPI interface 203 for a wake up signal and place the entire IC 800 in normal power mode upon receipt of the wake up signal. However, the thin power circuit can also perform further functions while in low power mode. It can, for example, reconfigure/recalibrate the IC 800 during low power mode, and/or forward interrupts from various external devices to the host during low power mode.

The IC 800 can include memory 802 connected to the thin power circuit through a memory interface 803. Additional memories can also be present in the digital and/or analog cores. However, memory 802 can differ from memories in the cores in that it may be used during low power mode. Thus, in some embodiments, the memory 802 can be always powered during low power mode. In other embodiments, the thin power circuit 801 can selectively provide or remove power to the memory 802 during low power mode.

The memory can be used to store configuration/calibration information for the IC 800. The thin power circuit can change the configuration/calibration information of the IC during the low power mode by storing new information into the memory 802. The thin power circuit can do this in response to commands issued by the host 804. Thus, the host may be able to reconfigure the IC 800 without taking it out of low power mode.

Furthermore, the IC can include I/O configuration memory 805. The I/O configuration memory can be similar to the memory 802 (it may also be a part of memory 802) but it may store I/O configuration information. Thus, the I/O configuration memory may also be powered during the low power mode (power during that mode may be either selectively provided by the thin power circuit, or always provided). The I/O configuration information may define the configuration of a plurality of I/O pads or pins that may be part of an I/O ring 806 of the IC 800. In various embodiments, the configuration of the pads may define whether they are input or output pads, their voltage(s), their input/output resistances, etc. Again, the host may be able to change the I/O configuration memory 805 during the low power mode by sending commands to the thin power circuit, which may in turn write new configuration information to the I/O configuration memory 805.

The IC 800 can also be connected to external devices 807, such as keyboard, buttons and/or sensor(s). The IC 800 can communicate with these external devices during ordinary operation. However, some of the communications with these external devices may be so simple that the IC may be able to perform them even during low power mode. Thus, the thin power circuit 801 can be connected to the external devices 807 through an external device scan logic 808. The thin power circuit can receive information from the external devices (such as, for example button presses, etc.) and alert the host 804 when appropriate. The thin power circuit can alert the host by sending an interrupt through interrupt connection 809. Thus, some initial processing of external inputs can be performed while still in the low power mode. The host may subsequently determine whether the external inputs require that the IC 800 be put into normal power mode. Thus, for example, the system can avoid wasting power by placing the IC 800 into normal power mode as a result of merely incidental contact with various user interface buttons, sensors, etc.

The thin power circuit of FIG. 8 can also feature error checking. Error checking can be performed for data received by the thin circuit such as commands to change configuration options or commands to power up the core received from the host or information received from the external devices. Additionally, information generated by the thin power circuit, such as interrupts sent to the host can be supplemented by error codes in order to allow the host to perform error checks on it. Error checking can be performed in a manner similar to the one discussed above in connection with FIG. 3.

As with the FIG. 3 version of the thin power circuit, the thin power circuit of FIG. 8 can be thin, or configured to use minimal power during the low power mode.

Various embodiments of the invention may utilize different type of ICs and thin power circuits. For example, the thin power circuit need not be as "thin" as the one shown in FIG. 3 and may include many more elements. In some embodiments there need not be a division between the thin power circuit 205 and the power manager 207. Instead, both these can be a single unit that is powered at all times (i.e., even during the low power mode). In some embodiments, there can be more than two power modes with different levels of power. In some embodiments, another type of digital interface (other than SPI) can be used.

The above embodiments are discussed in relation to the SPI data transmission standard. It is known that this standard may be practiced over various types of physical connections. For example, standard CMOS, standard bipolar, low-voltage differential signaling (LVDS) or transition minimized differential signaling (TMDS) connections can be used. Embodiments of the invention may include any of these physical connection standards. Furthermore, embodiments of the invention are not limited to the SPI standard of data transmission but may include other known data transmission standards, such as, for example, universal serial bus (USB), Firewire, PCI Express, etc.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An integrated circuit (IC) capable of responding to power-up messages while in a low-power state, the IC comprising:
a digital interface;
a digital input connected to the digital interface;
a configuration memory configured to store configuration information defining a configuration of the IC;
primary operation circuitry connected to the digital interface and configured to perform one or more primary tasks, the primary operation circuitry configured for selectively having at least a portion of its power removed during a low power mode; and
a first power manager connected to the primary operation circuitry and the digital input, the first power manager configured to receive a set of one or more predefined digital signals over the digital input during the low power mode, change the information stored in the configuration memory, and initiate a power up of the primary operation circuitry in response to the set of predefined digital signals;
wherein the primary operation circuitry includes a second power manager configured to be powered down during the low power mode, and further configured to be powered up and perform power up operations on the primary operation circuitry in response to a signal from the first power manager.

2. The IC of claim 1, wherein the digital interface is configured to transmit and receive digital data according to a predefined digital transmission standard, and the set of predefined digital signals is in accordance with the predefined digital transmission standard.

3. The IC of claim 2, wherein the predefined digital transmission standard is the Serial Peripheral Interface (SPI) standard.

4. The IC of claim 3, wherein the set of predefined digital signals is a valid SPI frame.

5. The IC of claim 2, wherein the predefined digital transmission standard includes one or more standards selected from the group consisting of the low-voltage differential signaling (LVDS), transition minimized differential signaling (TMDS), universal serial bus (USB), Firewire and PCI Express standards.

6. The IC of claim 1, wherein the IC is configured to remove all power from the primary operation circuitry.

7. The IC of claim 1, wherein the first power manager is configured to remove substantially all power from the primary operation circuitry.

8. The IC of claim 1, wherein the first power manager includes a primary state flip flop the primary state flip flop having a first and a second state, the primary state flip flop being in the first state during a first time period when the primary operation circuitry is fully powered and in ordinary operation and in the second state during a second time period when power is removed from the primary operation circuitry, wherein the first and second time periods do not include any transition periods during which the primary operation circuitry is in the process of being powered up, or having power removed therefrom.

9. The IC of claim 8, wherein the primary state flip flop causes the first power manager to ignore signals arriving from the digital input when the primary state flip flop is in the first state and to monitor the digital input for the set of predefined digital signals when the primary state flip flop is in the second state.

10. The IC of claim 1, wherein the digital input includes a plurality of digital connections and the set of predefined digital signals includes a plurality of digital signals received at respective ones of the plurality of digital connections.

11. The IC of claim 1, wherein the first power manager includes one or more inputs connected to the primary operation circuitry, said inputs being used to receive signals indicating an upcoming removal of power from the primary operation circuitry, the first power manager further including one or more resistive pull downs connected to the one or more inputs connected to the primary operation circuitry.

12. The IC of claim 11, wherein the primary operation circuitry is configured to keep the one or more inputs connected to the primary operation circuitry at a low or ground voltage level for most of the time, setting them to a high voltage level only during relatively short pulses.

13. The IC of claim 1, wherein the second power manager is configured to perform complex power up and power down procedures, and to lose substantially all power when substantially all power is removed from the primary operation circuitry.

14. The IC of claim 13, wherein the first power manager uses substantially less power than the second power manager.

15. The IC of claim 1, wherein the first power manger uses substantially less power than the primary operation circuitry.

16. The IC of claim 1, wherein the set of one or more predefined digital signals includes a payload portion and an error checking portion, and the first power manager is configured to check the payload portion based on the error checking portion before powering up the primary operation circuitry.

17. A portable audio player including an integrated circuit (IC) capable of responding to power-up messages while in a low-power state, the IC comprising:
a digital interface;
a digital input connected to the digital interface;
a configuration memory configured to store configuration information defining a configuration of the IC;
primary operation circuitry configured to perform one or more primary tasks and connected to the digital interface, the IC being configured to selectively remove at least a portion of its power from the primary operation circuitry during a low power mode; and
a first power manager connected to the primary operation circuitry and the digital input, the first power manager configured to
receive a set of one or more predefined digital signals over the digital input during the low power mode,
in response to the set of predefined digital signals, change the information stored in the configuration memory, and initiate a power up of the primary operation circuitry;
wherein the primary operation circuitry includes a second power manager configured to be powered down during the low power mode, and further configured to be powered up and perform power up operations on the primary operation circuitry in response to a signal from the first power manager.

18. A mobile telephone including an integrated circuit (IC) capable of responding to power-up messages while in a low-power state, the IC comprising:

a digital interface;
a digital input connected to the digital interface;
a configuration memory configured to store configuration information defining a configuration of the IC;
primary operation circuitry configured to perform one or more primary tasks and connected to the digital interface, the IC being configured to selectively remove at least a portion of its power from the primary operation circuitry during a low power mode; and
a first power manager connected to the primary operation circuitry and the digital input, the first power manager configured to
receive a set of one or more predefined digital signals over the digital input during the low power mode, and
in response to the set of predefined digital signals, change the information stored in the configuration memory, and initiate a power up of the primary operation circuitry;
wherein the primary operation circuitry includes a second power manager configured to be powered down during the low power mode, and further configured to be powered up and perform power up operations on the primary operation circuitry in response to a signal from the first power manager.

19. A method for operating an integrated circuit (IC) including primary operation circuitry including a digital interface, a digital input connected to the digital interface, a configuration memory configured to store configuration information defining a configuration of the IC, a second power manager dedicated for managing power of the primary operation circuitry and configured to be powered down during the low power mode, and a first power manager, the method comprising:
powering down at least a portion of the primary operation circuitry including the second power manager during a low power mode while keeping the first power manager powered;
receiving a set of one or more predefined digital signals over the digital input by the first power manger during the low power mode; and
in response to the set of predefined digital signals, initiating a power up of the primary operation circuitry by the first power manager, including
changing the information stored in the configuration memory and
powering up the second power manager in response to a signal from the first power manager, and
powering up the primary operation circuitry by the second power manager.

20. The method of claim 19, further comprising receiving the set of one or more predefined digital signals in accordance with a predefined digital transmission standard.

21. The method of claim 20, wherein the predefined digital transmission standard is the Serial Peripheral Interface (SPI) standard.

22. The method of claim 21, wherein the set of predefined digital signals is a valid SPI frame.

23. The method of claim 19, wherein powering down the primary operation circuitry includes removing substantially all power from the primary operation circuitry.

24. The method of claim 19, wherein powering down the primary operation circuitry includes removing all power from the primary operation circuitry.

25. The method of claim 19, wherein the powering down the primary operation circuitry is performed at least partially by the first power manager.

26. The method of claim 19, wherein the first power manager includes a primary state flip flop the primary state flip flop having a first and a second state, the primary state flip flop being in the first state during a first time period when the primary operation circuitry is fully powered and in ordinary operation and in the second state during a second time period when power is removed from the primary operation circuitry, wherein the first and second time periods do not include any transition periods during which the primary operation circuitry is in the process of being powered up, or having power removed therefrom.

27. The method of claim 26, further comprising:
ignoring signals arriving from the digital input when the primary state flip flop is in the first state; and
monitoring the digital input for the set of predefined digital signals when the primary state flip flop is in the second state.

28. The method claim 19, wherein the digital input includes a plurality of digital connections and the set of predefined digital signals includes a plurality of digital signals received at respective ones of the plurality of digital connections.

29. The method of claim 19, wherein the first power manager includes one or more inputs connected to the primary operation circuitry, the method further comprising:
receiving signals by the first power manager from the one or more inputs connected to the primary operation circuitry, the signals indicating an upcoming removal of power from the primary operation circuitry;
setting the one or more inputs connected to the primary operation circuitry to a low or ground voltage when the primary operation circuitry is powered down by using resistive pull downs connected to the one or more inputs connected to the primary operation circuitry.

30. The method of claim 29, further including:
keeping the one or more inputs connected to the primary operation circuitry at a low or ground voltage level for most of the time; and
setting them to a high voltage level only during relatively short pulses to indicate an upcoming removal of power from the primary operation circuitry.

31. An integrated circuit (IC) capable of reconfiguration while in a low-power state, the IC comprising:
a configuration memory configured to store configuration information for the IC;
a digital interface;
a digital input connected to the digital interface;
primary operation circuitry configured to perform one or more primary tasks and connected to the digital interface, the IC being configured to selectively remove at least a portion of its power from the primary operation circuitry during a low power mode; and
a first power manager connected to the primary operation circuitry, the digital input and the configuration memory and configured to
receive a set of one or more predefined digital signals over the digital input during the low power mode,
in response to the set of predefined digital signals, change the information stored in the configuration memory,
wherein changing the information stored in the configuration memory results in a change of the configuration of the IC;
wherein the primary operation circuitry includes a second power manager dedicated for managing power of the primary operation circuitry and configured to be powered down during the low power mode, and further configured to be powered up and perform power up operations on the primary operation circuitry in response to a signal from the first power manager.

32. The IC of claim 31, wherein the configuration memory includes core configuration memory.

33. The IC of claim 31, wherein the configuration memory includes I/O configuration memory.

34. The IC of claim 31, wherein the first power manager is configured to use small amount of power in relation to the primary operation circuitry.

35. The IC of claim 31, wherein the set of one or more predefined digital signals includes a payload portion and an error checking portion, and the first power manager is configured to check the payload portion based on the error checking portion before changing the information stored in the configuration memory.

36. An integrated circuit (IC) capable of communication with external devices while in a low-power state, the IC comprising:
- an external device interface connected to one or more external devices;
- a host interface connected to a host;
- a configuration memory configured to store configuration information defining a configuration of the IC;
- primary operation circuitry configured to perform one or more primary tasks and connected to the external device interface and the host interface, the IC being configured to selectively remove at least a portion of its power from the primary operation circuitry during a low power mode; and
- a first power manager connected to the primary operation circuitry, and the external device and host interfaces, the first power manager configured to
  - receive a set of one or more predefined digital signals over the external device interface during the low power mode, and
  - in response to the set of predefined digital signals, change the information stored in the configuration memory, and send a signal to the host over the host interface,
- wherein the primary operation circuitry includes a second power manager configured to be powered down during the low power mode, and further configured to be powered up and perform power up operations on the primary operation circuitry in response to a signal from the first power manager.

37. The IC of claim 36, wherein the host interface is an interrupt interface, and the signal sent to the host over the host interface is an interrupt signal.

38. The IC of claim 36, wherein the external devices are user interface devices.

39. The IC of claim 36, wherein the external devices comprise one or more devices selected from a group consisting of: a keyboard, a button, a touch sensor, a proximity sensor, and a mouse.

40. The IC of claim 36, wherein the first power manager is configured to use small amount of power in relation to the primary operation circuitry.

41. The IC of claim 36, wherein the set of one or more predefined digital signals includes a payload portion and an error checking portion, and the first power manager is configured to check the payload portion based on the error checking portion before sending the signal to the host.

42. The IC of claim 36, wherein the first power manager is further configured to perform the following as part of sending a signal to the host:
- generate a set of payload data;
- generate a set of error checking data based on the payload data in accordance with a predefined error checking protocol; and
- send the payload data along with the error checking data to the host.

43. An integrated circuit (IC) capable of responding to power-up messages while in a low-power state, the IC comprising:
- a digital interface;
- a digital input connected to the digital interface;
- a configuration memory configured to store configuration information defining a configuration of the IC;
- primary operation circuitry connected to the digital interface and configured to perform one or more primary tasks, during a normal power mode of operation of the IC, and to shut down operation during a low power mode of operation of the IC; and
- a first power manager connected to the primary operation circuitry and the digital input, the first power manager configured to operate during the normal and low power modes of the IC, the first power manager configured to receive a set of one or more predefined digital signals over the digital input during the low power mode and, in response to the set of predefined digital signals, change the information stored in the configuration memory;
- wherein the primary operation circuitry includes a second power manager configured to be powered down during the low power mode, and further configured to be powered up and perform power up operations on the primary operation circuitry in response to a signal from the first power manager, and
- wherein at least a portion of the first power manager is in a disarmed state during a normal power mode.

\* \* \* \* \*